(12) United States Patent
Das Sharma et al.

(10) Patent No.: US 9,665,415 B2
(45) Date of Patent: May 30, 2017

(54) LOW-LATENCY INTERNODE COMMUNICATION

(71) Applicant: Intel Corporation, Santa Clara, CA (US)

(72) Inventors: Debendra Das Sharma, Saratoga, CA (US); Michelle C. Jen, Sunnyvale, CA (US); Joseph Murray, Scottsdale, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/866,955

(22) Filed: Sep. 26, 2015

(65) Prior Publication Data

US 2017/0091003 A1 Mar. 30, 2017

(51) Int. Cl.
*G06F 13/00* (2006.01)
*G06F 9/54* (2006.01)
*G06F 13/24* (2006.01)
*G06F 13/42* (2006.01)

(52) U.S. Cl.
CPC .............. *G06F 9/546* (2013.01); *G06F 13/24* (2013.01); *G06F 13/4282* (2013.01)

(58) Field of Classification Search
CPC .......... G06F 9/542; G06F 9/544; G06F 9/546; G06F 13/24

USPC .......................... 710/260; 719/312, 313, 318
See application file for complete search history.

(56) References Cited

U.S. PATENT DOCUMENTS

| | | | |
|---|---|---|---|
| 5,414,132 A | 5/1995 | Stein et al. | |
| 6,912,716 B1 * | 6/2005 | Johanson | G06F 15/167 709/214 |
| 7,940,932 B2 * | 5/2011 | Paksoy | G06F 21/78 380/247 |
| 2014/0082120 A1 * | 3/2014 | Ma | G06F 15/167 709/213 |

* cited by examiner

*Primary Examiner* — Andy Ho
(74) *Attorney, Agent, or Firm* — The Law Office of Herbert T. Patty

(57) ABSTRACT

A low-latency internode messaging scheme bypasses the nodes' I/O stacks to use fabrics or links that support memory process logic (e.g., SMI3) or electrical process logic (e.g., PCIe) on the "node side" between the nodes and a pooled memory controller (or pooled storage controller), and on the "pooled side" between that controller and its pooled memory or storage. The controller may translate and redirect messages and look up addresses. The approaches accommodate 2-level memory (locally attached node memory and accessible pooled memory) with either or both levels private, globally shared, allocated to a subset of the nodes, or any combination. Compatible interrupt schema use the messaging links and components.

20 Claims, 10 Drawing Sheets

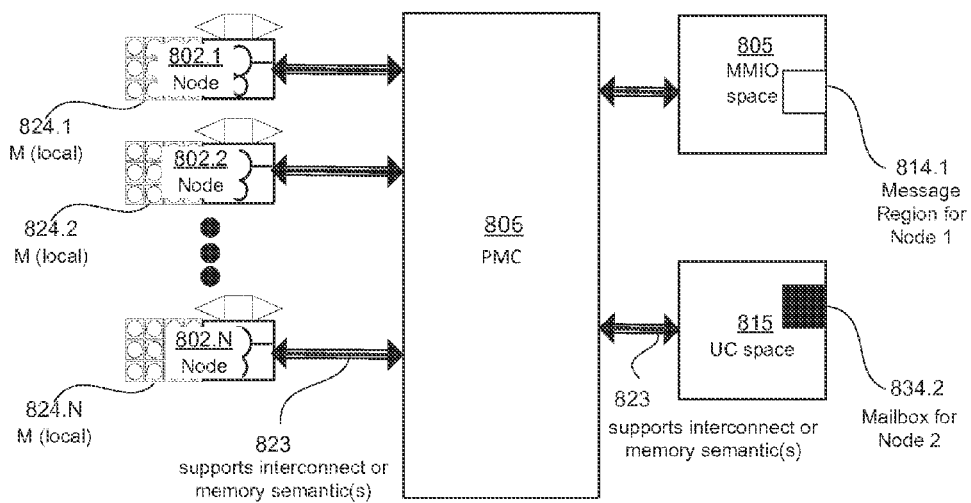
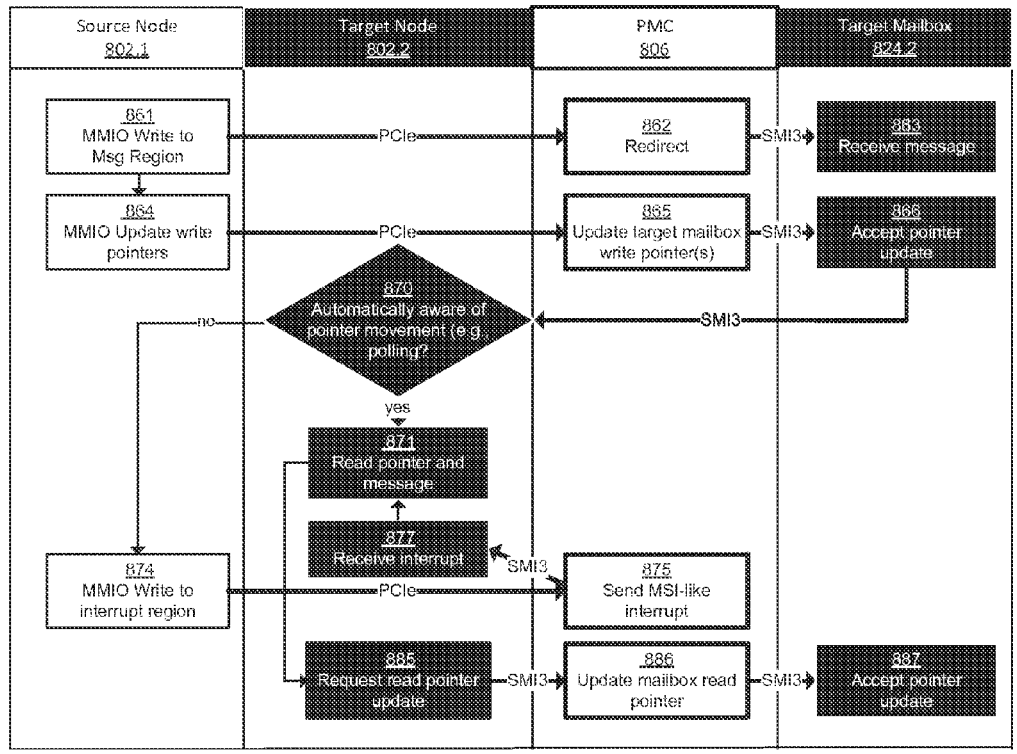
FIG. 8A
FIG. 8B

LOW-LATENCY INTERNODE COMMUNICATION

FIELD

Related fields include distributed and parallel computing, particularly internode communication.

BRIEF DESCRIPTION OF DRAWINGS

FIGS. 8A and 8B are a block diagram and a cross-functional diagram of a parallel computing network with node-side links supporting electrical semantics and pooled-writeable-medium side links supporting memory semantics.

DETAILED DESCRIPTION

Figure 1A:
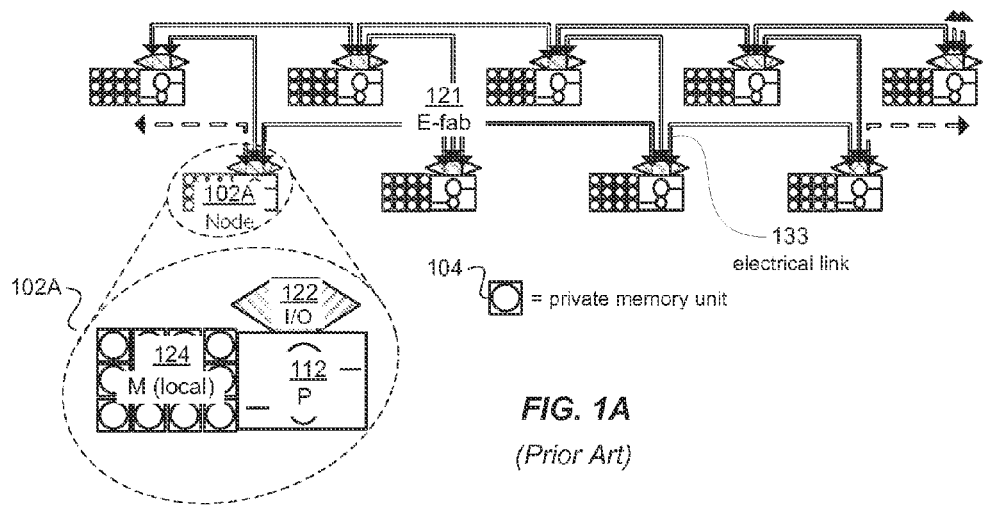
FIGS. 1A and 1B illustrate generic distributed and parallel computing networks to aid understanding of the more complex networks of the present disclosure.

Parallel computing, in which operations are distributed between multiple linked processors, can potentially analyze very large amounts of data (e.g., genetic or large-scale meteorological information) much faster than serial computing in which operations are done one at a time on a single processor. However, parallel computing presents its own challenges. For instance, if operations running on different processors change the same variable, the results may be inaccurate or non-repeatable if one of the processors accesses the variable before the other processor has finished changing it. Programming measures such as locks and semaphores have been used to protect variables from such simultaneous access by more than one operation.

Consequently, some parts of the process are still somewhat serial, namely the acquiring and releasing of variables that are used by multiple processors. Any serial process may become a bottleneck that limits the production rate of final results. One area of exploration involves shortening the latency between a first processor's release of one of these "borrowed" variables and the next processor's acquisition and use of it. In some parallel computing arrangements, the nodes (CPUs or other processors, optionally with one or more peripherals) communicate with each other by "message passing" or simply "messaging."

For purposes herein, a "message" is information (e.g., commands or data) attached to a pair of addresses. One address is associated with the source node (or "sender" or "producer"). The other address is associated with the target node (or "recipient" or "consumer").

Some internode communication schema for high-performance computers, networks and clusters use an I/O stack such as Ethernet, InfiniBand (IB), or proprietary solutions by Cray Inc. and others. Use of an I/O stack may contribute to unwanted latency; for example, if each of the "message-writes" by a program or application triggers multiple reads and writes (e.g., of separated message subsections) by the memory or storage component. In some processes, address extraction from metadata and continuous backup such as RAID may also contribute to latency.

The following terms shall have the following meanings for purposes of this document:

Electrical Semantics: May include circuitry used to control access to shared memory locations.

Fabric: A network of nodes and links that resembles a woven fabric when viewed from above.

Latency: The amount of time a message takes to traverse a system.

Link: A data path over which messages may be exchanged between two or more electronic components.

Link, coherent: A link using a protocol that facilitates cache and memory coherency.

Link, electrical: A link capable of carrying messages in electrical-interconnect semantics, such as I/O semantics used to access drives, network adapters, and the like. Non-limiting examples include Peripheral Component Interconnect Express (PCIe) semantics, Ethernet semantics, InfiniBand semantics, and proprietary semantics suitable for I/O. Future variations and successors to present I/O semantic types that may be compatible with multi-node parallel node clusters and pooled memory or storage are also contemplated.

Link, memory: A link capable of carrying messages in semantics used to access memory, e.g., load/store (LD/ST) semantics.

Link, bi-semantic: A link capable of carrying messages in memory semantics or electrical semantics, e.g., a Plattsmouth (PLM) link.

Mailbox: An address space allocated to buffer received messages addressed to a particular node until they are read.

Memory Semantics: Process logic used to control access to shared memory locations.

Message region: An address space allocated to buffer messages written by a particular node until they are transmitted.

Node: A processor and its local peripherals, if any, linked to other processors with or without local peripherals in a parallel- or distributed-computing network. Nodes of a network may be distributed over a wide area (square km), a local area (square meters), a single chip, or any intermediate-sized area.

Pooled Memory: Non-local memory accessible by two or more nodes. The memory can be (1) volatile or non-volatile, (2) shared by all the connected nodes or allocated to specific nodes or groups of nodes or (3) any combination.

Pooled Storage: Non-local storage accessible by two or more nodes. The storage can be (1) non-volatile memory or other storage media, (2) shared by all the connected nodes or allocated to specific nodes or groups of nodes or (3) any combination.

Requesting, loading, or releasing a variable: Requesting, loading, or releasing the current value of a variable.

A potentially lower-latency alternative to I/O stack internode communication is internode communication through a fabric that supports memory load/store (LD/ST) semantics and/or high-speed electrical interconnect semantics such as PCIe. Embodiment categories include:

1) A source node writes the message to its message region and the message is transferred to the target node's mailbox, using memory semantics throughout.

2) A source node writes the message to its message region and the message is transferred to the target node's mailbox, using electrical semantics throughout.

3) A source node writes the message to its message region using memory semantics and the message is transferred to the target node's mailbox using electrical semantics.

4) A source node writes the message to its message region using electrical semantics and the message is transferred to the target node's mailbox using memory semantics.

Another aspect of the internode communication involves interrupts generated in memory semantics for transmission over a memory link or through a memory fabric or, alternatively electrical semantics for transmission over an electrical link or through an electrical fabric.

Embodiments of a computing system configured for low-latency messaging may include at least two processor nodes and at least one memory or storage component. The memory or storage component may include at least one message region for one of the processors and at least one mailbox for another processor. In some embodiments, a fixed set of hardware connections and switches may connect each node to its own message region and to target nodes' mailboxes.

In some embodiments, a messaging controller is wholly or partially dedicated to internode communication. The messaging controller may include a pooled-memory controller, a pooled-storage controller, or both. The messaging controller may include at least three communication interfaces (two processor-node-compatible interfaces (aka processor node interface) and one memory-compatible or storage-compatible interface (aka storage component interface). The communication interfaces may be configured to transmit and receive messages using memory semantics, electrical semantics, or both. The messaging controller may receive a message from a first node addressed to a second node, relay the message to the first node's message region, update the second node's mailbox, and send an indication (e.g., interrupt) to the second node directing it to read the message.

Figure 1B:
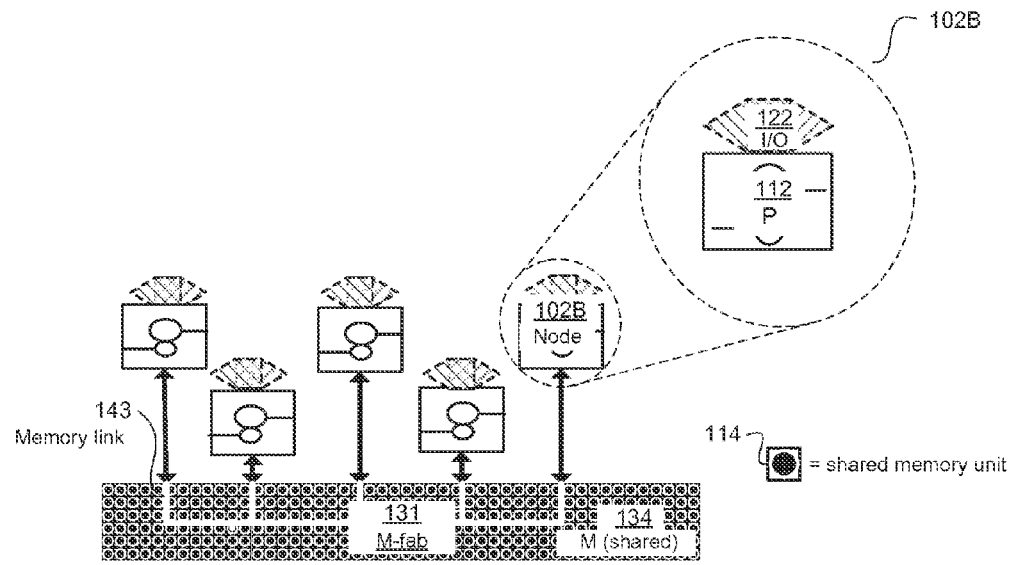

FIGS. 1A and 1B illustrate generic distributed and parallel computing networks to aid understanding of the more complex networks of the present disclosure.

FIG. 1A is an example of a distributed computing network connected by an electrical fabric. Each node 102A includes a processor 112, a local memory 124 made up of private memory units 104, and an I/O component 122 associated with processor 112's I/O stack. The electrical fabric 121 connecting nodes 102A includes multiple electrical links 133.

FIG. 1B is an example of a parallel computing network sharing a common memory component. Each node 102B includes a processor 112 and I/O component 122, but all the nodes 102B access a shared memory 134 made up of shared memory units 114. The memory fabric 131 connecting nodes 102A includes multiple memory links 143.

Figure 2:
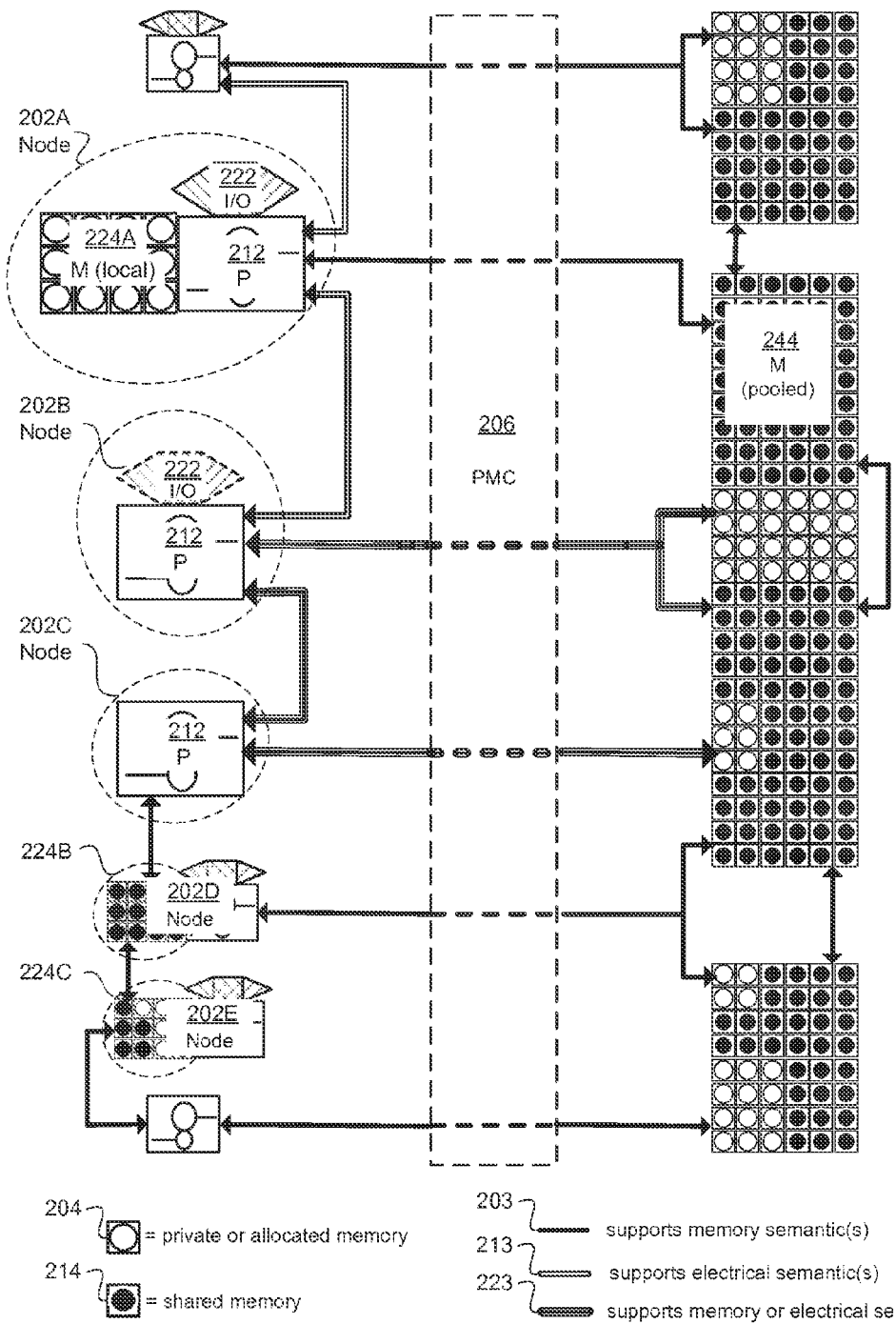
FIG. 2 illustrates a computing network with multiple and mixed types of nodes, links, and memory arrangements that may benefit from low-latency messaging options.

FIG. 2 illustrates a computing network with multiple and mixed types of nodes, links, and memory arrangements that may benefit from low-latency messaging options. Such networks may be customized to perform a specialized process on a particular type of data with optimized speed or some other desired characteristic.

Node 202A includes a processor 212, I/O component 222, and local private memory 224A. In addition, node 202A has access to a block of shared memory units 214 in pooled memory 244 through a memory link 203. Node 202B includes a processor 212 and I/O component 222, but no local memory. Instead, it accesses a block of shared memory units 214 and a block of allocated memory units 204 (which behave like private memory units) in pooled memory 244 through a bi-semantic link 223. Node 202C has only a processor 212 and accesses a block of allocated memory units 204 in pooled memory 244 through a bi-semantic link 223. Node 202C also accesses node 202D's local shared memory 224B and a shared portion of node 202E's local mixed memory 224 through memory links 203. The processors 212 of nodes 202A, 202B and 202C communicate directly with each other through electrical links 213 or bi-semantic links 223, either of which may be "coherent" links—that is, they operate on a link protocol that facilitates cache and memory coherency. Pooled memory 244 is made up of three separate modules connected to each other by memory links 203.

All these connections may be hard-wired, and the memory units of pooled memory 244 may be permanently configured as shared or allocated to a particular node. Alternatively, a pooled-memory controller (PMC) 206 may be interposed between the nodes 202 and the pooled memory 244. PMC 206 may have various capabilities. For example, PMC 206 may accept messages in electrical semantics from electrical links 213, translate the messages to memory semantics, and transmit the translated messages to pooled memory 244 through memory links 203. This may allow all the node connections to PMC 206 to be a fabric of electrical links 213 or a fabric of bi-semantic links (e.g., PLM links) 223, which may be more readily available in the processors, while the connections of PMC 206 to pooled memory 244 may constitute a memory fabric. In some embodiments, PMC 206 may be able to reconfigure pooled memory 244 to change the relative amount of shared memory units 214 compared to allocated memory units 204, if the system needs to be optimized for a different type of process or data.

Figure 3A:
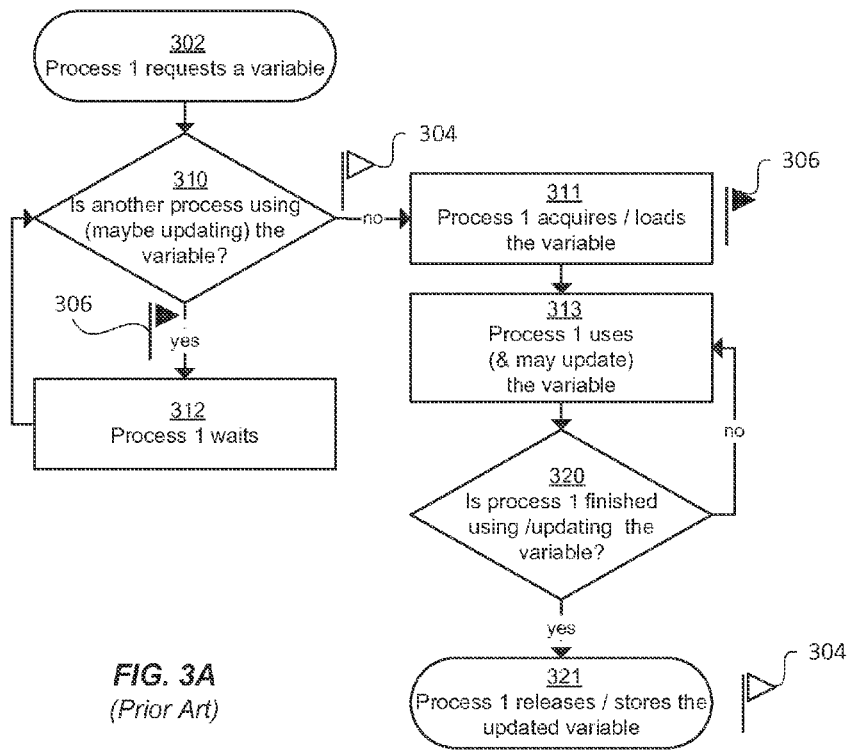
FIGS. 3A and 3B are flowcharts of a generic borrowed-variable process and a set of potentially low-latency messaging steps.
Figure 3B:
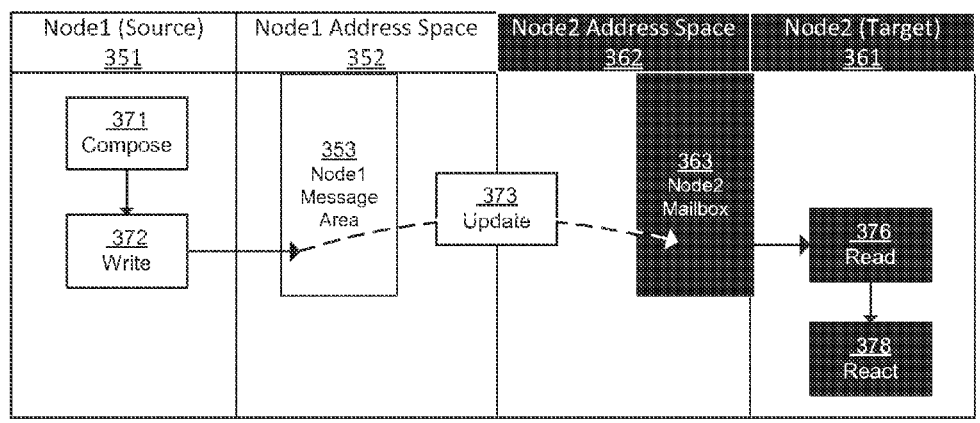

FIGS. 3A and 3B are flowcharts of a generic borrowed-variable process and a set of potentially low-latency messaging steps.

FIG. 3A is a flowchart of a flag-setting approach to control the borrowed variables. In the illustrated flag-setting flow, a flag bit associated with the particular variable may be set to 0 (represented by white flag 304) if the variable is available or may be set to 1 (represented by black flag 306) if the variable is unavailable (e.g., currently borrowed by a processor). When a processor encounters a call for a certain variable in its running operation, it performs step 302 to request the variable, thereby acting as a source node (i.e., the source of the request). In this flow, the request may take the form of accessing and reading the flag bit. Next, determining whether the variable is in use by another processor. This may include looking up a corresponding action for the flag state (Decision 310).

State 306 is associated with an unavailable variable; the corresponding action for the source node is to perform step 312 of waiting for the flag state to change before continuing its operation. While waiting, the source node may repeatedly poll the flag bit, or request a notification of a change in the flag state from some other component depending on the hardware and software arrangement. When the flag goes into state 304, associated with an available variable, the source node (assuming it is next in the queue) performs step 311 of acquiring and loading the variable. Meanwhile, the flag returns to state 306 to notify other nodes that the variable has become unavailable.

Flag state 306 continues while the source node performs step 313 of using and possibly updating the variable. Next, detecting the end of the variable's role in the instant operation may include reading a "variable ### done" line, or something similar, coded into the operation (Decision 320). While the source node is still using the variable, step 313 continues and flag state 306 persists. When the source node has finished using the variable (at least for the present stage of the operation), the source node performs step 321 of releasing the variable and storing its current value. After the source node performs step 321, the flag state changes to 304, signaling to one or more other nodes that the variable is available for their use.

To help reduce the time that nodes spend waiting for borrowed variables, the operations may be coded to call borrowed variables only when they are immediately needed and to release them as soon as their use and updating comes to an end (or a break long enough for another node to make use of the variable).

FIG. 3B is a cross-functional flowchart of an internode messaging process usable by some embodiments. A first node in a network acts as the source node, composing and writing a message for a second node to read and react thereto.

Node1 (source node) 351 performs message composing step 371, then either performs or controls another component to perform message writing step 372. Writing step 372 writes the message to a portion of Node1's address space 352 designated as Node1's message area 353. This triggers an update to a portion of an address space 362 designated as a mailbox 363 for Node2 (target node) 361. At some point (e.g., in response to an interrupt), Node2 performs message reading step 376 and reacting step 378 (e.g., action or suspension of action).

Details of writing step 372, updating step 373, reading step 376, and the hardware involved may vary among different embodiments of the messaging system. The message itself may be rendered in memory semantics, electrical semantics or may switch from one to the other depending on the types of link connecting Node1 (source node) 351, Node1 message area 353, Node2 mailbox 363, and Node2 (target node) 361. For example, the links may include one or more of memory links, electrical links, or bi-semantic links such as PLM. Additionally or alternatively, updating step 373 may be initiated by the source node, by the target node, or by an intermediary component such as a pooled memory controller. Additionally or alternatively, the update in Node2 mailbox 363 may be the entire message written by Node1 351 or only part of it. For example, if Node1 message area 353 could be written only by Node1 351, but could be read by any node including Node2 361, the update in Node2's mailbox 363 might only be the address of Node1's message area 353, where Node2 361 would look up, read, and react to the message(s) addressed to its own mailbox.

Figure 4:
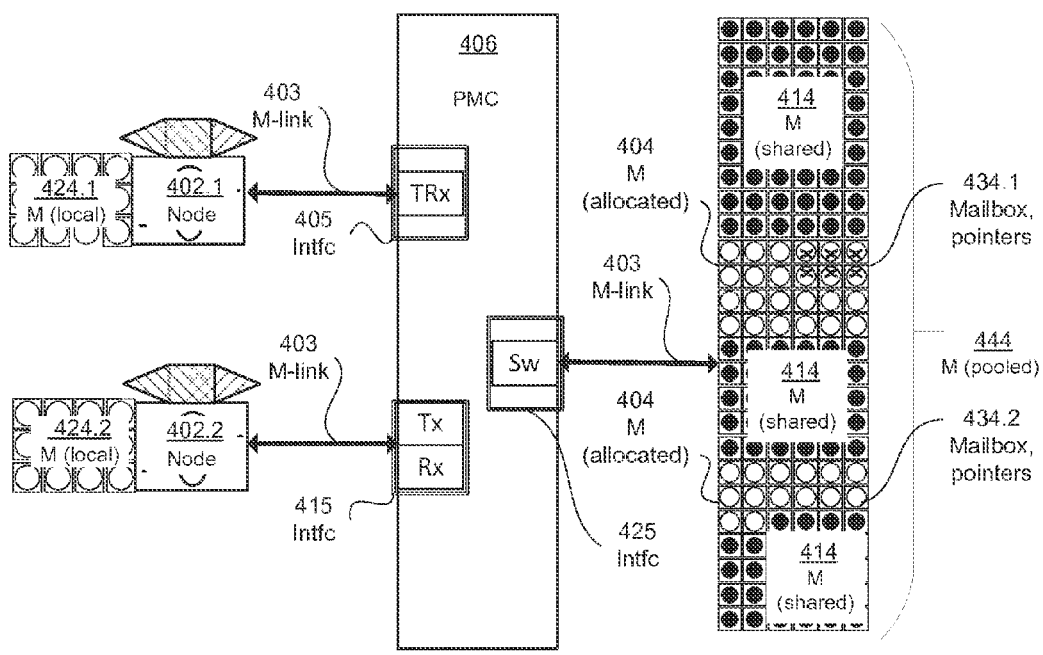
FIG. 4 is a block diagram of a parallel computing network with all links supporting memory semantics.

FIG. 4 is a block diagram of a parallel computing network with all links supporting memory semantics. Although beneficial for large fabric-connected networks, the disclosed principles may be implemented on a pooled memory controller (PMC) with as few as three connections: two connections to nodes and one connection to a memory pool.

Pooled-memory controller (PMC) 406 is illustrated with one transceiver interface 405, one transmitter/receiver interface 415, and one "non-endpoint" switch interface 425. However, any number of the interfaces could be transceiver interfaces 405, transmitter/receiver interfaces 415, switch interfaces 425, or any other suitable endpoint or non-endpoint interface (e.g., communication endpoints).

Pooled memory 444 may include both shared memory 414 and allocated memory 404 associated with particular nodes. Allocated memory 404 may include mailbox 434.1 for node 402.1 and mailbox 434.2 for node 402.2. Mailboxes 434.1 and 434.2 may include pointers. In addition, pooled memory 444 may include volatile memory, non-volatile memory, or both. Pooled memory 444 may be a single continuous memory block or multiple interconnected memory blocks. The memory blocks and interconnects may include memory drives connected by PLM links or DIMMs connected by DDRT busses.

The links connecting PMC 406 to node 402.1, node 402.2, and pooled memory 444 are illustrated as memory link 403. However, for the all-memory-semantics case they only need to be able to support memory semantics; for example, they could be bi-semantic links for which memory is one of the supported semantics.

At least one of node 402.1 or node 402.2 has an address space including a message region enabling it to act as a source node. At least the other of node 402.2 or node 402.1 has an address space including a mailbox enabling it to act as a target node. In some embodiments, both node 402.1 and node 402.2 have address spaces including message regions and address spaces including mailboxes for 2-way internode communication. The address spaces may be in pooled memory 444 or in local memory 424.1 and 424.2 attached to the nodes. The target node's mailbox region may be physically backed up in the target node's locally attached memory or in memory behind the PMC.

Figure 5:
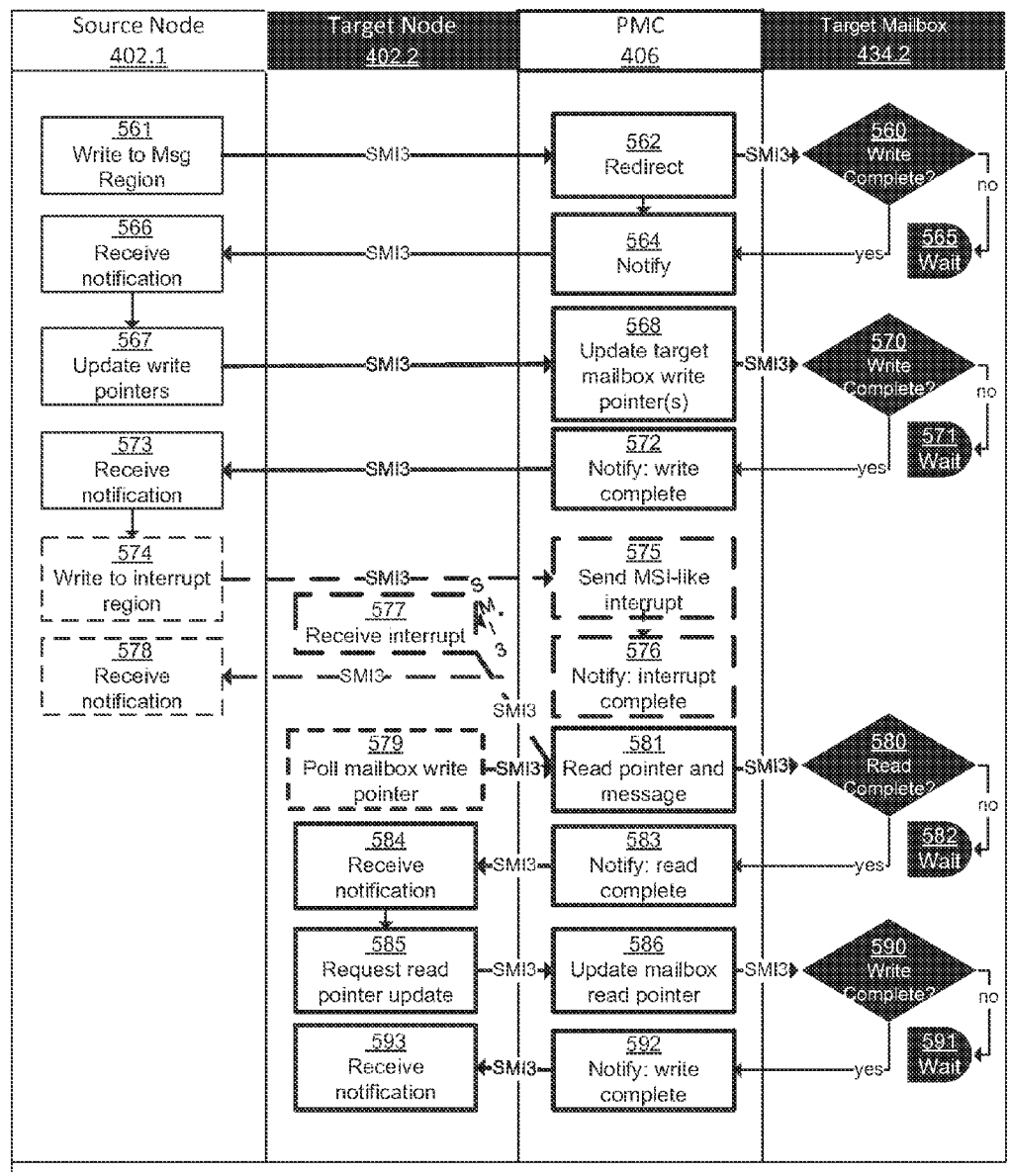
FIG. 5 is a cross-functional flowchart of a process for internode messaging that uses memory semantics throughout.

FIG. 5 is a cross-functional flowchart of a process for internode messaging that uses memory semantics throughout. The illustrated process uses SMI3, but any other suitable memory semantic may be used.

Reference numbers in the 400 series refer to elements of FIG. 4.

In this example, both source node 402.1 and the physical backing of target local memory 424.1 are on the "node side" of PMC 406, while the target mailbox and pointers are in uncacheable (UC) space physically backed in allocated pooled memory 404 on the opposite, "memory side" of PMC 406, which may also be expressed as being "behind" PMC 406. All the illustrious links are Intel® scalable memory interconnects (SMI3), but any other suitable architecture and protocol may be used.

At step 561, the source node 402.1 writes a message to its message region. At step 562, PMC 406 redirects the message; for example, PMC 406 may translate the recipient address in the message to map it to target node 402.2's mailbox region 434.2. At step 565, target mailbox 434.2 waits until "write complete=yes" at decision 560. When this happens, it is followed by step 564, in which PMC 406 sends a write-complete notification to source node 402.1. At step 566, source node 402.1 receives the write-complete notification.

After one or more of these message-region writes that directly update target mailbox 434.2, source node 402.1 performs a UC write, step 567, to cause PMC 406 to update the write pointer of target node 402.2's mailbox 434.2 in step 568. At step 571, target mailbox 434.2 waits until "write complete=yes" at decision 570. When this happens, it is followed by step 572, in which PMC 406 sends a write-complete notification to source node 402.1. At step 573, source node 402.1 receives the write-complete notification.

Two of the options for prompting target node 402.2 to read its message are represented by dotted-line shapes and arrows.

The first option, outlined in long dashes, involves an interrupt. It begins with step 574, an interrupt request written to source node 402.1's interrupt region (another address space like the message region that may be either local to source node 402.1 or behind PMC 406). At step 575, PMC 406 sends an interrupt to target node 402.2. The interrupt may be structured similarly to a message-signaled interrupt (MSI). At step 576, PMC 406 sends an interrupt-complete notification to source node 402.1; at step 578, source node 402.1 receives the write-complete notification; and at step 577, target node 402.2 receives the interrupt.

The second option, outlined in short dashes, involves polling. At step 579, target node 402.2 periodically polls its mailbox write pointer to detect its motion when one or more new messages enter target mailbox 434.2.

With either prompting approach (or suitable substitutes known in the art), at step 581, target node 402.2 reads its mailbox write pointer and the message from source node 402.1. At step 582, target node 402.2 waits until "read complete=yes" at decision 580. When this happens, it is followed by step 583, in which PMC 406 sends a read-complete notification to target node 402.2. At step 584, target node 402.2 receives the read-complete notification. Target node 402.2 then requests an update to the read pointer at step 585. At step 586, PMC 406 updates target node 402.2's mailbox read pointer. At step 591, target node 402.2 waits until "read complete=yes" at decision 590. When this happens, it is followed by step 592, in which PMC 406 sends a write-complete notification to target node 402.2. At step 593, target node 402.2 receives the write-complete notification.

This implementation is suitable for controlling the order of production and consumption of borrowed variables. Preferably, each source node may be able to compare the size of its message with the space remaining in the target mailbox to prevent mailbox overflow. To reduce any latency generated by the mailboxes' being located in uncacheable space behind the PMC, in some embodiments the target nodes may prefetch and cache reads to their mailbox region, using the data only once and then flushing the affected cacheline(s).

Figure 6A:
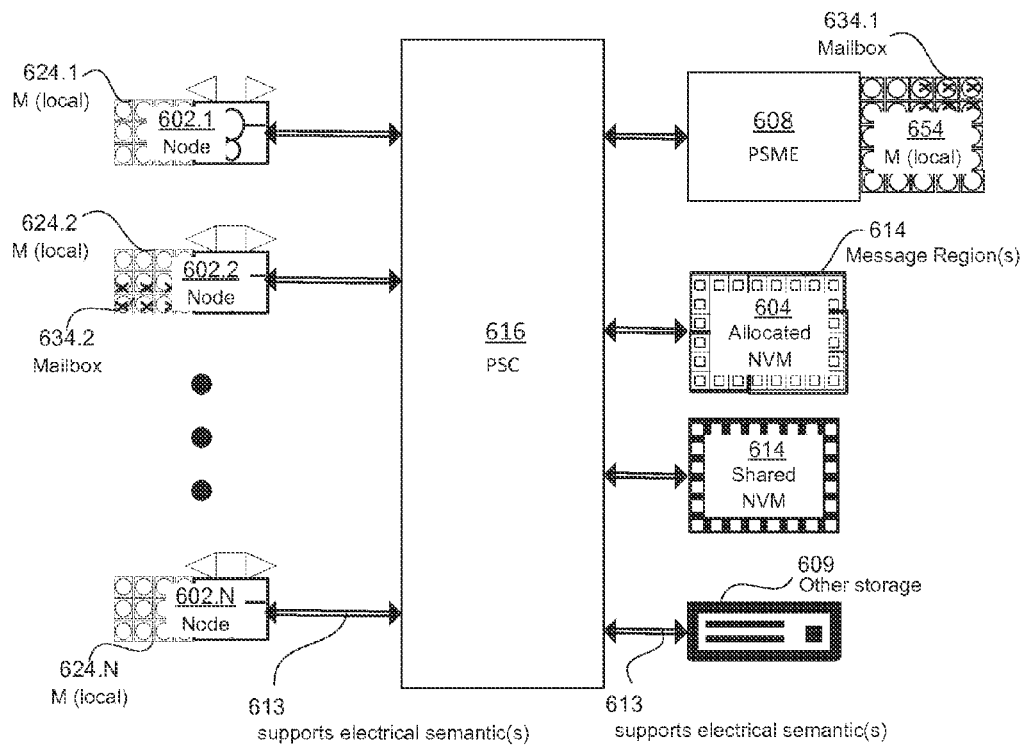
FIGS. 6A and 6B are a block diagram and a cross-functional diagram of a parallel computing network with all links supporting electrical semantics.
Figure 6B:
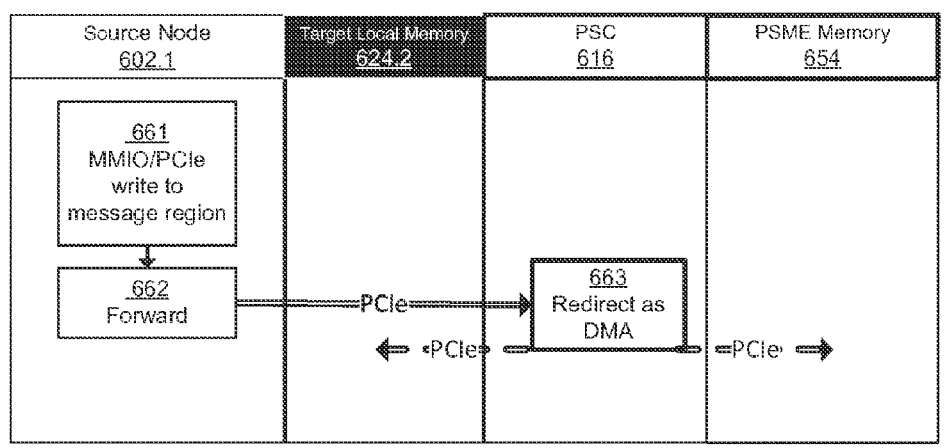

FIGS. 6A and 6B are a block diagram and a cross-functional diagram of a parallel computing network with all links supporting electrical semantics. PCIe connections are illustrated, but any suitable architecture and protocol that supports electrical semantics may be used, such as Ethernet or InfiniBand on larger-scale networks.

In FIG. 6A, a group of nodes 602.1, 602.2 . . . 602.N may be connected to pooled storage controller (PSC) 616. PSC 616 may also be connected to one or more storage modules; for example, shared nonvolatile memory (NVM, e.g., NVMe) 614, allocated NVM 604 and other storage 609. Other storage 609 may be, for example, magnetic or optical storage. PSC 616 may additionally be connected to a pooled system management engine (PSME) 608. All the connections to PSC 616 are electrical links 613. Nodes 602.1, 602.2, 602.N may have attached local memories 624.1, 624.2 . . . 624.N. PSME 608 may have its own dedicated PSME local memory 654. Mailbox backing regions for the nodes may be in the PSME local memory 654 like mailbox 634.1 or in the node local memory 624.x like mailbox 634.2.

FIG. 6B is a cross-functional diagram of a process for internode messaging in a system similar to FIG. 6A using only electrical semantics. At step 661, source node 602.1 performs a memory-mapped input/output (MMIO)/PCIe write to its message region. At step 662, source node 602.1 forwards the message to PSC 616. At step 663, PSC 616 redirects the message as direct memory access (DMA) to target mailbox 634.2, which may be physically backed in part of target node 602.2's local memory 624.2 or in part of PSME memory 654.

Figure 7A:
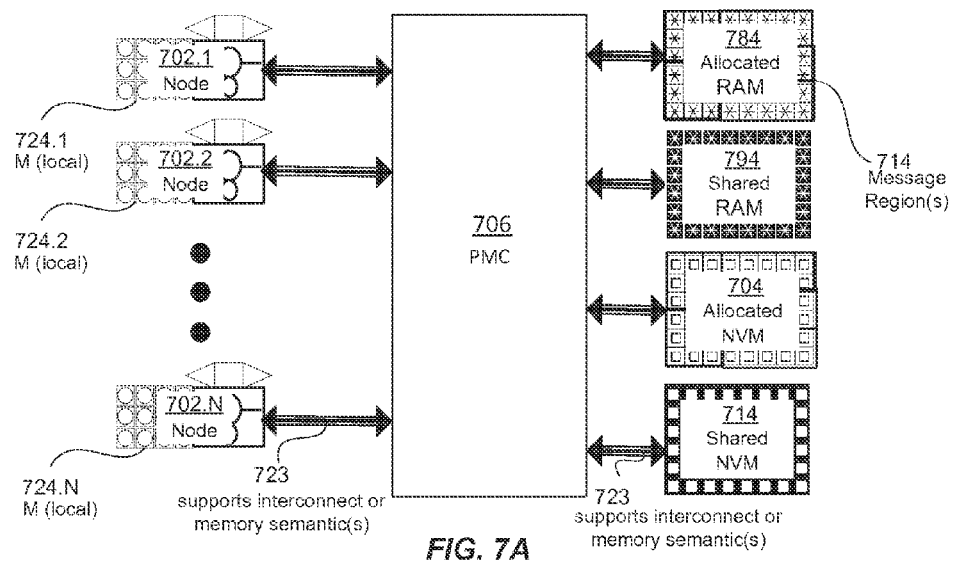
FIGS. 7A and 7B are a block diagram and a cross-functional diagram of a parallel computing network with node-side links supporting memory semantics and pooled-writeable-medium side links supporting electrical semantics.
Figure 7B:
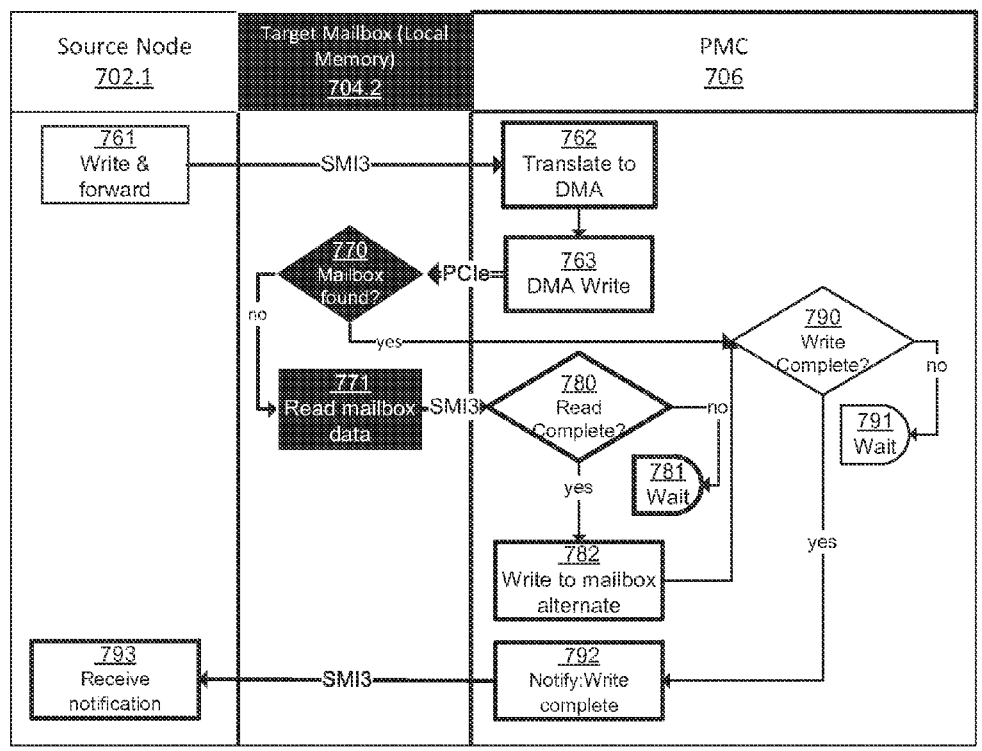

FIGS. 7A and 7B are a block diagram and a cross-functional diagram of a parallel computing network with node-side links supporting memory semantics and pooled-writeable-medium side links supporting electrical semantics.

In FIG. 7A, a group of nodes 702.1, 702.2 . . . 702.N may be connected to pooled memory controller (PMC) 706 on a "node side". Nodes 702.1, 702.2, . . . , 702.N may have attached local memory 724.1, 724.2, . . . 724.N, which may be private to the attached node's processor, shared globally, or allocated to a defined group of nodes' processors. PMC 706 may also be connected to one or more memory modules on a "pooled side"; for example, shared NVM (e.g., NVMe) 714, allocated NVM 704, allocated RAM 784 or shared RAM 794. PMC 706 makes the pooled memory modules accessible to nodes 702.1, 702.2, . . . 702.N. Nodes 702.1, 702.2, . . . 702.N thus have two levels of memory; local and pooled. Mailbox backing regions for the nodes may be in node local memory 724.1, 724.2 . . . 724.N.

All the connections on the node side (from nodes 702.1, 702.2 . . . 702.N to PMC 706) are illustrated as bi-semantic links 723, but memory links may be substituted. All the connections on the pooled side (from PMC 706 to Allocated RAM 784, Shared RAM 794, Allocated NVM 704 and shared NVM 714) are illustrated as bi-semantic links 723, but electrical links may be substituted. An advantage of bi-semantic links is their ability to support memory semantics or electrical semantics, so the processes herein and their equivalents and hybrids may be interchanged without changing any hardware.

FIG. 7B is a cross-functional diagram of a process for internode messaging in a system similar to FIG. 7A using memory semantics from the source node to the PMC and electrical semantics from the PMC to the target node. At step 761, source node 702.1 performs a memory write of the message to its message region, forwarding the message to PMC 706. At step 762, PMC 706 translates the message to DMA. At step 763, PMC 706 attempts to write the DMA message to a target mailbox whose default location is local memory 724.2. If an available mailbox space is found in local memory 724.2, the message is written there. Alternatively, in the event of a near-memory miss, where a mailbox space is not found in target local memory 724.2 at decision 770 (e.g., the mailbox has been moved or is full), the target local memory 704.2 reads out to PMC 706 which retrieves the line. PMC 706 waits in step 781 until the read is complete and decision 780="yes" before completing the write in the target node's designated alternate memory (e.g., part of the pooled memory) at step 782.

Until the write is complete either in local memory 724.2 or an alternate mailbox space, PMC 706 waits at step 791 until the write is complete and decision 790="yes" before sending a write-completion notification at step 792 that is received by the source node at step 793.

FIGS. 8A and 8B are a block diagram and a cross-functional diagram of a parallel computing network with node-side links supporting electrical semantics and pooled-writeable-medium side links supporting memory semantics.

In FIG. 8A, a group of nodes 802.1, 802.2 . . . 802.N may be connected to pooled memory controller (PMC) 806 on a "node side". Nodes 802.1, 802.2, . . . , 802.N may have attached local memory 824.1, 824.2, . . . 824.N, which may be private to the attached node's processor, shared globally, or allocated to a defined group of nodes' processors. PMC 806 may also be connected to one or more memory modules on a "pooled side" that include MMIO space 805 and UC space 815. PMC 806 makes the pooled memory modules accessible to nodes 802.1, 802.2, . . . 802.N. Nodes 802.1, 802.2, . . . 802.N thus have two levels of memory; local and pooled. Message regions 834 for the nodes may be backed in MMIO space 805. Mailbox backing regions 824 for the nodes may be in UC space 815.

All the connections on the node side (from nodes 802.1, 802.2 . . . 802.N to PMC 806) are illustrated as bi-semantic links 823, but electrical links may be substituted. All the connections on the pooled side (from PMC 806 to MMIO space 805 and UC space 815) are illustrated as bi-semantic links 823, but memory links may be substituted. An advantage of bi-semantic links is their ability to support memory semantics or electrical semantics, so the processes herein and their equivalents and hybrids may be interchanged without changing any hardware.

FIG. 8B is a cross-functional flowchart of a messaging process using electrical semantics (e.g., PCIe) for writes from the source node and memory semantics (e.g., SMI3) for reads by the target node. At step 861, source node 802.1 sends a MMIO write request to its message region 834.1 via PMC 806 using electrical semantics (e.g., PCIe). PMC 806 recasts the message in memory semantics (e.g., SMI3) in step 862 and sends it to target mailbox 824.2. At step 863, target mailbox 824.2 receives the message. At step 864, source node 802.1 sends a MMIO request to PMC 806 to update the write pointer(s) in target mailbox 824.2. At step 865, PMC 806 recasts the message in memory semantics (e.g., SMI3) in step 862 and sends it to target mailbox 824.2. At step 866, target mailbox 824.2 accepts the pointer update.

The process branches at decision 870; target node 802.2 may or may not automatically sense and react to changes in the write pointers of its mailbox 824.2. If so, target node 802.2 may proceed to read the pointer and message immediately at step 871. If not, another option is for source node 802.1 to send an interrupt at step 874 to target node 802.2 via PMC 806. PMC 806 recasts the message in memory semantics (e.g., SMI3) in step 875 and sends it to target node 802.2. At step 877, target node 802.2 receives the interrupt and reads the pointer and message at step 871. With the latter scheme, the PMC may take on the task of monitoring the mailbox status and looking up the interrupt policy of each of the potential target nodes, rather than having the functions and information replicated on each of the source nodes. After reading the write pointers and message, target node 802.2 may use memory semantics to request a read pointer update at step 885 to avoid unnecessarily re-reading the message. PMC 806 updates the mailbox read pointer at step 886, and target node mailbox 824.2 accepts the pointer update at step 887.

Figure 9A:
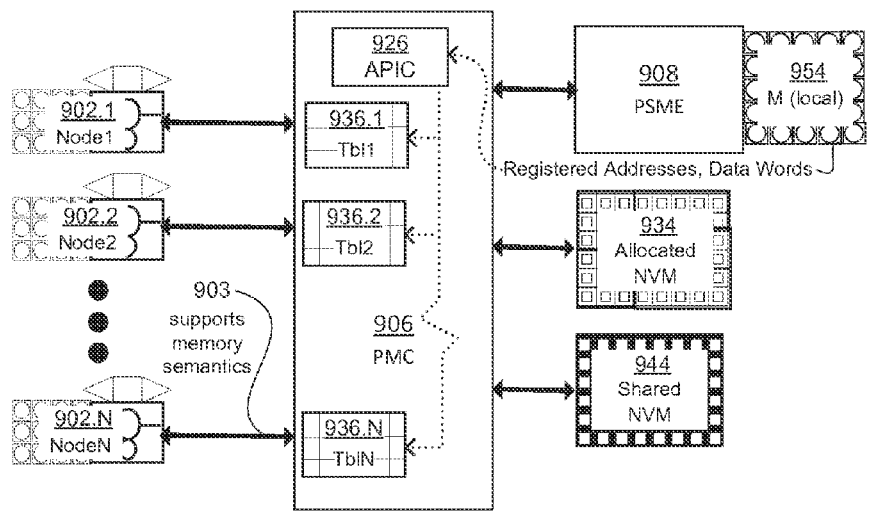
FIGS. 9A-9C illustrate structures and functions of a PMC system configured to support internode interrupts similar to message signaled interrupts (MSI) using only memory semantics.
Figure 9B:
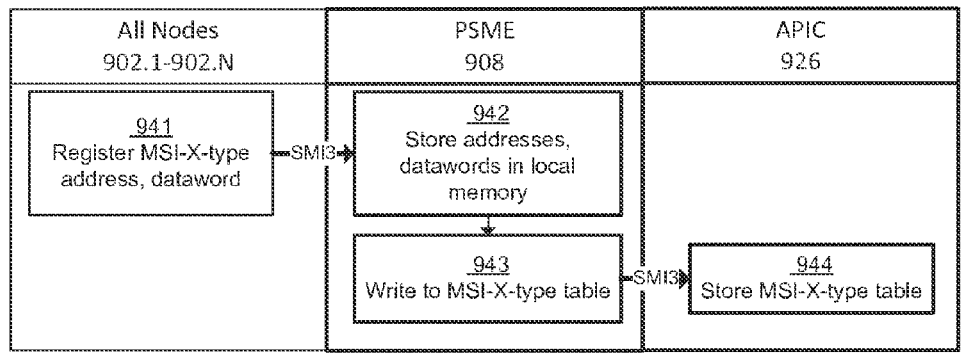
Figure 9C:
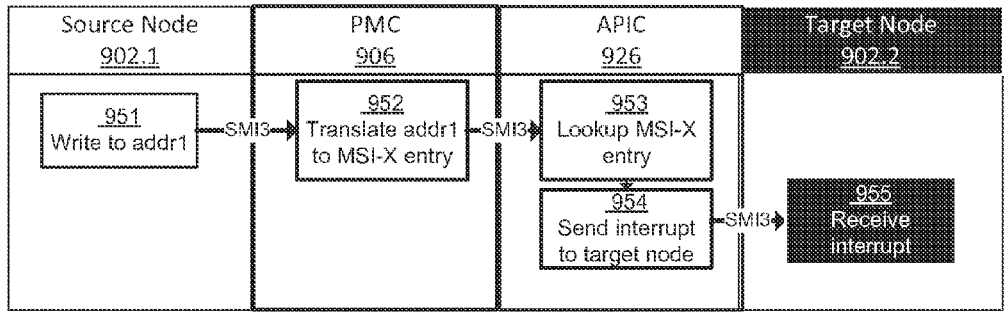

FIGS. 9A-9C illustrate structures and functions of a PMC system configured to support internode interrupts similar to message signaled interrupts (MSI) using only memory semantics. Like the messaging approaches disclosed herein, these interrupt techniques can also work on a PSC.

FIG. 9A is a block diagram of a PMC, node network, and pooled memory configured to support MSI-like internode interrupts using only memory semantics. Nodes 902.1-902.N are connected to PMC 906 by memory links 903. PMC 906 includes Advanced Programmable Interrupt Controller (APIC) 926 generating MSI-x-like tables 936.1-936.N corresponding to the nodes 902.1-902.N. Like MSI-x tables, tables 936.1-936.N can store a large number of interrupts, each with its own separate target address and data word. PMC 906 is also connected to PSME 908 as well as pooled memory and/or storage such as allocated NVM 904 and shared NVM 914. In addition, PSME 908 has its own dedicated PSME local memory 954.

FIG. 9B is a cross-functional flowchart of the setup process for MSI-x-like tables 936.1-936.N. At step 941, each of the nodes 902.1-902.N registers a set of addresses and data words with PSME 908 by writing to a pre-allocated registration range in PSME local memory 954, where PSME 908 stores them at step 942. At step 943, PSME 908 organizes the addresses and data words into MSI-x-like tables 936.1-936.N. At step 943, PSME 908 writes MSI-x-like tables 936.1-936.N to APIC 926, where APIC 926 stores them at step 944.

FIG. 9C is a cross-functional flowchart of generating and sending internode interrupts using only memory semantics with a configuration similar to FIG. 9A. At step 951, source node 902.1 performs a UC write to an address associated with target node 902.2 and sends it to PMC 906. At step 952, PMC 906 translates the address on the UC write to a global address for target node 902.2 and sends it to APIC 926. The global address is associated with an entry in MSI-x-like tables 936.1-936.N. At step 953, APIC 926 generates the interrupt by looking up the address and data word corresponding to the entry, then sends the interrupt to target node 902.2 at step 954. At step 955, target node 902.2 receives the interrupt.

Figure 10A:
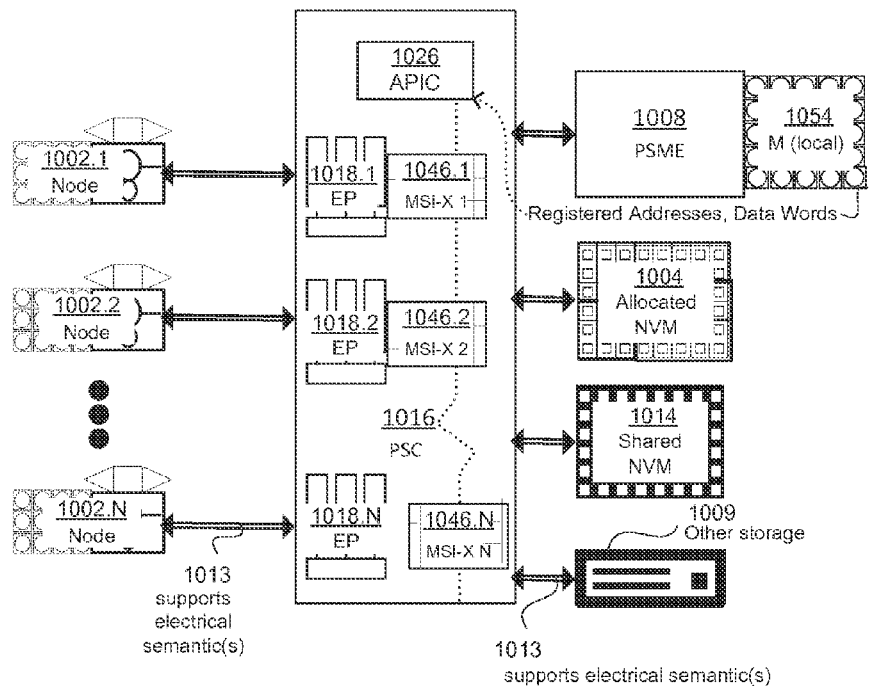
FIGS. 10A and 10B illustrate structures and functions of a PSC system configured to support internode interrupts similar to message signaled interrupts (MSI) using only electrical semantics.
Figure 10B:
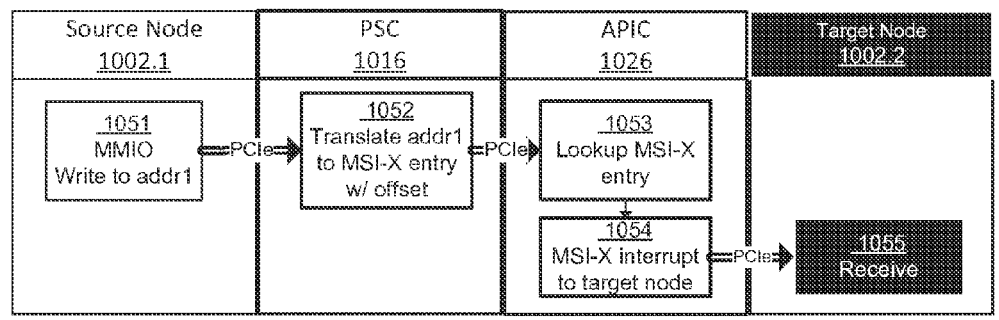

FIGS. 10A and 10B illustrate structures and functions of a PSC system configured to support internode interrupts similar to message signaled interrupts (MSI) using only electrical semantics. Like the messaging approaches disclosed herein, these interrupt techniques can also work on a PMC.

FIG. 10A is a block diagram of a PSC, node network, and pooled storage configured to support MSI-x internode interrupts using only electrical semantics. Nodes 1002.1-1002.N are connected to PSC 1016 by electrical links 1013 terminating at the PSC end with electrical (e.g., PCIe) endpoints 1018.1, 1018.2, 1018.N. In the case of PCIe, the endpoints 1018.1, 1018.2, 1018.N are associated with MSI-x tables 1046.1, 1046.2, 1046.N programmed with standard software flows. PSC 1016 includes Advanced Programmable Interrupt Controller (APIC) 1026, which generates MSI-x tables 1046.1-1046.N. PMC 1016 is also connected to PSME 1008 as well as pooled memory and/or storage such as allocated NVM 1004, shared NVM 1014, and optionally other storage 1009 (e.g., magnetic or optical). In addition, PSME 1008 is connected to dedicated PSME local memory 1054.

FIG. 10B is a cross-functional flowchart of generating and sending internode interrupts using only electrical semantics with a configuration similar to FIG. 10A. At step 1051, source node 1002.1 performs a MMIO write to an address associated with target node 1002.2 and sends it to PMC 1016. At step 1052, PMC 1016 translates the address on the MMIO write to a global address for target node 1002.2 and sends it to APIC 1026. The global address corresponds to a base address and offset of target node 1002.2's designated MSI-x table 1046.2. At step 1053, APIC 1026 generates the interrupt by looking up the address and data word corresponding to the entry in target endpoint 1018.2's MSI-x table 1046.2, then sends the interrupt to target node 1002.2 at step 1054. At step 1055, target node 1002.2 receives the interrupt.

Examples

Example 1 is a system comprising a plurality of processor nodes comprising a first processor node and a second processor node; at least one storage component which comprises a message region for each processor node and a mailbox for each processor node. The system further comprising controller having a processor node interface and a storage component interface. The controller is operable to receive a message from the first processor node addressed to the second processor node, relay the message to a message region assigned to the first processor node, update a mailbox assigned to the second processor node, and send an indication to the second processor node directing the second processor node to read the message.

In Example 2, the subject matter of Example 1 can further comprise a pooled system management engine (PSME) attached to a local memory.

In Example 3, the subject matter of Example 1 can further comprise an advanced programmable interrupt controller (APIC) coupled to the PSME.

In Example 4, the subject matter of Example 1, wherein the indication sent to the second processor node is an interrupt.

In Example 5, the subject matter of any of Examples 2 and 3, wherein the storage component includes at least one memory component.

In Example 6, the subject matter of Example 1, wherein the processor node interface comprises a transceiver, a transmitter and receiver, or a switch.

In Example 7, the subject matter of Example 1 can further comprise a local memory attached to at least one of the plurality of processor nodes.

In Example 8, the subject matter of Examples 2, 3, 4, 5, 6, and 7, wherein the at least one storage component comprises globally shared memory or storage, allocated memory shareable by only a subset of the plurality of processor nodes, and private memory or storage designated for use by a single processor node.

In Example 9, the subject matter of Example 1 can further comprise a plurality of processor-node-side communication links to couple the plurality of processor nodes to the controller.

In Example 10, the subject matter of Example 1, wherein the plurality of processor-node-side communication links support a Peripheral Component Interconnect protocol.

In Example 11, the subject matter of Example 1 can further comprise a plurality of pooled-side communication links to couple the controller to the at least one storage device.

Example 12 is a controller comprising a processor-node communication interface and a storage-component communication interface. The controller further comprises internal logic capable of receiving a message from a first processor node addressed to a second processor node, relaying the message to a message region assigned to the first processor node, updating a mailbox assigned to the second processor node, and sending an indication to the second processor node directing the second processor node to read the message.

In Example 13, the subject matter of claim 12 can further comprise internal logic capable of translating the message or the indication to a different type of process logic.

In Example 14, the subject matter of claim 12 can further comprise a communication endpoint coupled to each processor-node communication interface.

In Example 15, the subject matter of claim 12, wherein the first processor node is attached to a local node memory and wherein the controller is coupled to read or write the local node memory.

Example 16 is non-transitory machine-readable information storage medium containing code that, when executed, causes a machine to perform actions. The actions comprise writing a message to a first address space by a first processor node; updating a second address space in response to the writing in the first address space; reading the message in response to the second address space being updated by a second processor node. The message comprises memory logic or electrical logic.

In Example 17, the subject matter of Example 16, wherein the second processor node reads the message in response to an interrupt sent by the first processor node.

In Example 18, the subject matter of Example 16, wherein the second processor node reads the message in response to finding the update while polling the second address space.

In Example 19, the subject matter of Example 16, the actions can further comprise a controller sending a write-complete notification to the first processor node.

In Example 20, the subject matter of Examples 16 and 19, the actions can further comprise the controller changing process logic or a protocol of the message and directing the changed message to the second address space.

The preceding Description and accompanying Drawings describe examples of embodiments in some detail to aid understanding. However, the scope of protection may also include equivalents, permutations, and combinations that are not explicitly described herein. Only the claims appended here (along with those of parent, child, or divisional patents, if any) define the limits of the protected intellectual-property rights.

The invention claimed is:

1. A system, comprising:
   a plurality of processor nodes comprising a first processor node and a second processor node;
   at least one storage component, the at least one storage component comprises:
   a message region for each processor node; and
   a mailbox for each processor node; and
   a controller having a processor node interface and a storage component interface,
   wherein the controller is operable to receive a message from the first processor node addressed to the second processor node, relay the message to a message region assigned to the first processor node, update a mailbox assigned to the second processor node, and send an indication to the second processor node directing the second processor node to read the message.

2. The system of claim 1 further comprising a pooled system management engine (PSME) attached to a local memory.

3. The system of claim 2 further comprising an advanced programmable interrupt controller (APIC) coupled to the PSME.

4. The system of claim 1, wherein the indication sent to the second processor node is an interrupt.

5. The system of claim 1, wherein the storage component includes at least one memory component.

6. The system of claim 1, wherein the processor node interface comprises a transceiver, a transmitter and receiver, or a switch.

7. The system of claim 1 further comprising a local memory attached to at least one of the plurality of processor nodes.

8. The system of claim 1, wherein the at least one storage component comprises globally shared memory or storage, allocated memory shareable by only a subset of the plurality of processor nodes, and private memory or storage designated for use by a single processor node.

9. The system of claim 1 further comprising a plurality of processor-node-side communication links to couple the plurality of processor nodes to the controller.

10. The system of claim 9, wherein the plurality of processor-node-side communication links support a Peripheral Component Interconnect protocol.

11. The system of claim 1 further comprising a plurality of pooled-side communication links to couple the controller to the at least one storage device.

12. A controller, comprising:
a processor-node communication interface and a storage-component communication interface,
internal logic capable of receiving a message from a first processor node addressed to a second processor node, relaying the message to a message region assigned to the first processor node, updating a mailbox assigned to the second processor node, and sending an indication to the second processor node directing the second processor node to read the message.

13. The controller of claim 12 further comprising internal logic capable of translating the message or the indication to a different type of process logic.

14. The controller of claim 12 further comprising a communication endpoint coupled to each processor-node communication interface.

15. The controller of claim 12, wherein the first processor node is attached to a local node memory;
and wherein the controller is coupled to read or write the local node memory.

16. A non-transitory machine-readable information storage medium containing code that, when executed, causes a machine to perform actions, the actions comprising:
writing a message to a first address space by a first processor node;
updating a second address space in response to the writing in the first address space;
reading the message in response to the second address space being updated by a second processor node, and wherein the message comprises memory logic or electrical logic.

17. The non-transitory machine-readable information storage medium of claim 16, wherein the second processor node reads the message in response to an interrupt sent by the first processor node.

18. The non-transitory machine-readable information storage medium of claim 16, wherein the second processor node reads the message in response to finding the update while polling the second address space.

19. The non-transitory machine-readable information storage medium of claim 16, wherein the actions further comprise a controller sending a write-complete notification to the first processor node.

20. The non-transitory machine-readable information storage medium of claim 17, wherein the actions further comprise the controller changing process logic or a protocol of the message and directing the changed message to the second address space.

* * * * *